(12) United States Patent
Ericksen et al.

(10) Patent No.: US 8,567,432 B2
(45) Date of Patent: Oct. 29, 2013

(54) VALVE BOX PLATFORM

(75) Inventors: Kent C. Ericksen, Centerville, UT (US);
Stuart J. Eyring, Bountiful, UT (US);
E. Tres Wangsgaard, Holladay, UT (US);
Daniel R. Petersen, Kaysville, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 422 days.

(21) Appl. No.: 12/695,966

(22) Filed: Jan. 28, 2010

(65) Prior Publication Data

US 2011/0180159 A1 Jul. 28, 2011

(51) Int. Cl.
*E03B 1/00* (2006.01)

(52) U.S. Cl.
USPC .............................. 137/377; 137/343; 137/382

(58) Field of Classification Search
USPC ......... 137/343, 363, 364, 377, 382, 356, 372; 220/484, 661, 676
See application file for complete search history.

(56) References Cited

U.S. PATENT DOCUMENTS

| | | | |
|---|---|---|---|
| 3,490,637 A | 1/1970 | Pope | |
| 3,770,873 A | 11/1973 | Brown | |
| 3,961,528 A * | 6/1976 | Ford | 73/201 |
| 4,065,020 A | 12/1977 | Carson | |
| 4,163,503 A | 8/1979 | McKinnon | |
| 4,310,015 A | 1/1982 | Stewart et al. | |
| 4,872,575 A | 10/1989 | Kobilan | |
| 4,976,366 A | 12/1990 | Russell | |
| 5,037,238 A | 8/1991 | Wait | |
| 5,394,898 A | 3/1995 | Turner | |
| 5,728,973 A * | 3/1998 | Jorgensen | 174/666 |
| 6,035,887 A | 3/2000 | Cato | |
| 6,264,056 B1 * | 7/2001 | King | 220/484 |
| 6,460,563 B2 | 10/2002 | Olson et al. | |
| 6,772,566 B1 | 8/2004 | Machledt | |
| 6,834,662 B1 | 12/2004 | Olson et al. | |
| 7,004,677 B1 | 2/2006 | Ericksen | |
| 7,243,810 B2 * | 7/2007 | O'Brien et al. | 220/484 |
| 2004/0231724 A1 | 11/2004 | Mahaney | |

* cited by examiner

*Primary Examiner* — John Fox
*Assistant Examiner* — Kevin Murphy
(74) *Attorney, Agent, or Firm* — Austin Rapp & Hardman

(57) ABSTRACT

A valve box platform is disclosed. The valve box platform may include a peripheral wall having a receiving surface for receiving a valve box. The receiving surface may have an elevated peripheral surface that extends around an outer periphery of the receiving surface and a recessed peripheral surface that extends around an inner periphery of the receiving surface. A knockout portion may be positioned within the peripheral wall. The knockout portion may have a protruding portion that comprises a portion of the elevated peripheral surface of the peripheral wall. The peripheral wall may include a U-shaped recess having a rounded receiving portion, the U-shaped recess being aligned with the knockout portion.

22 Claims, 7 Drawing Sheets

VALVE BOX PLATFORM

TECHNICAL FIELD

The present invention relates generally to watering systems. More specifically, the present invention relates to a platform for a valve box for an irrigation system.

BACKGROUND

Valve boxes are frequently employed in connection with irrigation systems. In particular, valve boxes are frequently employed as housings to cover and shield irrigation valves in such systems. The valve boxes not only shield the irrigation valves from the elements, but also allow easy access to the valves when repairs or adjustments need to be made.

Unfortunately, valve boxes frequently need to be cut or modified to be utilized with the various irrigation conduits that are secured to valves within the valve boxes. Cutting and modification of valve boxes is a time-consuming process. In addition, after customized modification of a valve box, the valve box may not be usable in another situation. Further, cutting and modification of a valve box may undermine the structural integrity of the cover.

It should also be noted that after modification of the valve boxes, dirt and other debris may easily enter the valve box potentially damaging the irrigation valves or simply making it difficult to access the valves, when necessary.

Accordingly, improvements are desirable in this area.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
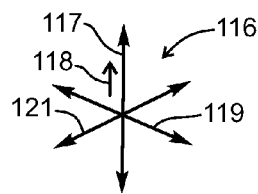
FIG. 1 is a perspective view of one embodiment of a valve box platform.
Figure 1:
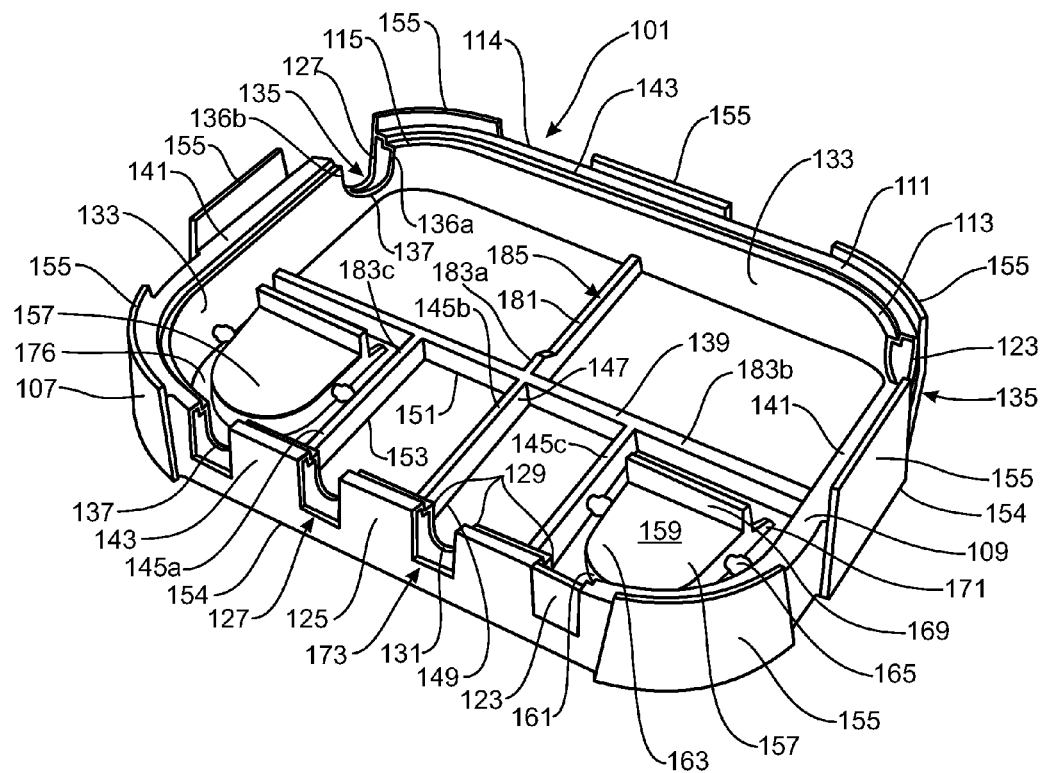

A valve box platform is disclosed. In one embodiment, the valve box platform may comprise a peripheral wall having a receiving surface for receiving a valve box. The receiving surface may include an elevated peripheral surface and a recessed peripheral surface with the elevated peripheral surface being elevated relative to the recessed peripheral surface along a height axis of the valve box platform. A knockout portion may be positioned within the peripheral wall. A U-shaped recess having a rounded receiving portion may be positioned within the peripheral wall with the U-shaped recess being aligned with the knockout portion.

In one configuration, the knockout portion includes a protruding portion that comprises a portion of the elevated peripheral surface of the peripheral wall. The knockout portion may be disposed in an outward-facing surface of the peripheral wall and the U-shaped recess may be disposed in an inward-facing surface of the peripheral wall.

The valve box platform may further comprise a manifold support bar attached to opposing, inward-facing surfaces of the peripheral wall. The bottom edge of the manifold support bar, in one embodiment, is generally coplanar with a bottom edge of the peripheral wall.

The valve box platform may further comprise a raised extension disposed adjacent to and outside the peripheral wall, with one end of the raised extension being elevated relative to the receiving surface of the peripheral wall. The valve box platform of claim 1 may further comprise a raised extension disposed on each corner of the peripheral wall.

In one embodiment, the valve box platform comprises a peripheral wall. A manifold support bar may be attached to opposing, inward-facing surfaces of the peripheral wall. At least one cross-support bar may be attached to the manifold support bar and the peripheral wall. In addition, the valve box platform may comprise at least one removable mouse hole cover with each removable mouse hole cover being secured by a breakaway runner to at least one of the manifold support bar, the manifold cross-support bar, or the peripheral wall. In a manufactured state, each mouse hole cover is generally coplanar with the manifold support bar and the at least one cross-support bar. In one embodiment, each mouse hole cover may comprise a main body with an arcuate end, a front surface, a lip extending from the front surface, and at least one leg extending away from the main body.

An elevated portion of the manifold support bar may be elevated relative to a recessed portion of the cross-support bar. Also, a bottom edge of the manifold support may be generally coplanar with a bottom edge of the peripheral wall. The valve box platform may further comprise a raised extension disposed on each corner of the peripheral wall.

In one embodiment, the valve box platform may comprise a peripheral wall having two opposing short walls and two opposing long walls arranged in a generally rectangular configuration. The peripheral wall may include a receiving surface, the receiving surface having an elevated peripheral surface that extends around an outer periphery of the receiving surface and a recessed peripheral surface that extends around an inner periphery of the receiving surface. A knockout portion may be positioned within the peripheral wall with the knockout portion having a protruding portion that comprises a portion of the elevated peripheral surface of the peripheral wall. A U-shaped recess may be positioned within the peripheral wall with the U-shaped recess being aligned with the knockout portion. A manifold support bar may be attached each of the two opposing short walls. At least one cross-support bar may be attached to the manifold support bar and one of the two long walls. A removable mouse hole cover may be secured by a breakaway runner to at least one of the manifold support bars, the manifold cross-support bar, or the peripheral wall. The removable mouse hole cover may be generally coplanar with the manifold support bar and the at least one cross-support bar in a manufactured state.

Each mouse hole cover may comprise a main body with an arcuate end, a front surface, a lip extending from the front surface, and at least one leg extending away from the main body. An elevated portion of the manifold support bar may be elevated relative to a recessed portion of the cross-support bar. A bottom edge of the manifold support is generally coplanar with a bottom edge of the peripheral wall. Also, the valve box platform may comprise a unitary molded piece.

The valve box platform may further comprise a raised extension disposed adjacent to at least one of the short walls, the raised extension being disposed outside of the peripheral wall. A top of the raised extension may be elevated relative to the receiving surface of the peripheral wall such that the raised extension may mate with the removable mouse hole cover when the mouse hole cover is detached from the valve box platform and secured over a mouse hole of a valve box positioned on the valve box platform.

In such an embodiment, the valve box platform may comprise a raised extension on each of the short walls and/or on at least one corner of the peripheral wall. The valve box platform may further comprise an open-ended lower surface defining a narrowing cavity such that a portion of a second valve box platform may be received in a contoured fit within the narrowing cavity.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

It should be noted that in certain drawings in which multiple identical or similar components or features appear at various places in the drawings, only one or a select number of these components or features are identified with reference numbers in order to prevent the drawings from becoming cluttered with reference numbers. In cases where only a single one or select number of these items or features are identified with reference numbers, the reference numbers in the following description refer to all or a select number of these items, whether or not specifically identified with a reference number.

FIG. 1 is a perspective view of one embodiment of a valve box platform 101. With reference to FIG. 1, the valve box platform 101 includes a peripheral wall 107 having a receiving surface 109. The receiving surface 109 includes an elevated peripheral surface 111 that extends around an outer periphery 114 of the receiving surface 109. The receiving surface 109 also has a recessed peripheral surface 113 that extends around an inner periphery 115 of the receiving surface 109.

With respect to FIG. 1, an axis 116 is shown illustrating a height axis 117, a length axis 119, and a width axis 121 of the valve box platform 101. These axes 117, 119, 121 are oriented relative to the valve box platform 101 itself, rather than being oriented based on a position of the valve box platform 101 relative to the earth's gravitational pull. As used herein, a point or item elevated relative to another point or item comprises a point or item further along the height axis 117 in the direction of the illustrated height vector 118, irrespective of the orientation of the valve box cover platform 101 relative to the earth's gravitational pull. A point or item that is lower relative to another point or item comprises a point or item further along the height axis 117 in the opposite direction of the illustrated height vector 118, again irrespective of the orientation of the valve box cover platform 101 relative to the earth's gravitational pull.

The elevated peripheral surface 111 and the recessed peripheral surface 113 are each for receiving valve boxes (e.g., part numbers 189 and 191 of FIGS. 4-6) of different sizes, respectively. For example, the recessed peripheral surface 113 may receive an "extension" valve box 189 of FIG. 4 and the elevated peripheral surface 111 may receive a "standard" (larger or taller) valve box 191 of FIGS. 5-6. With reference to FIG. 1, valve boxes of different sizes may each fit on each of the elevated peripheral surface 111 and the recessed peripheral surface 113. The elevated peripheral surface 111 and the recessed peripheral surface 113 are not necessarily contiguous, but may be interrupted, such by areas in which knockout portions 123 have or may be removed.

As indicated above, one or more knockout portions 123 may be positioned within an outward-facing surface 125 of the peripheral wall 107. The knockout portions 123 are selectively removable from the peripheral wall 107. When one of the knockout portions 123 is removed, a knockout portion recess 127 is formed. Terminal edges 129 of the knockout portion recess 127 may be contiguous with the elevated peripheral surface 111, as illustrated in FIG. 1.

One or more knockout portions 123 may be aligned with a U-shaped recess 131 within an inward-facing surface 133 of the peripheral wall 107. Terminal edges 129 of each U-shaped recess 131, in one embodiment, are contiguous with the recessed peripheral surface 113, as shown in FIG. 1.

Each knockout portion recess 127 (when the corresponding knockout portion 123 has been removed) together with an aligned U-shaped recess 131 form a conduit recess 135 in which an irrigation conduit 146 (shown, for example, in FIG. 3) may be situated. A knockout portion 123 is "aligned" with a U-shaped recess 131 when upon removal of the knockout portion 123, the knockout portion recess 127 and U-shaped recess 131 are aligned along the height axis 117, the length axis 119, and the width axis 121 such that these recesses 127, 131 may receive an irrigation conduit 146 (shown, for example, in FIG. 3). In one embodiment (not illustrated), a selectively removable knockout portion could also be positioned within a U-shaped recess 131 or, alternatively, a unitary, selectively removable knockout portion could occupy a knockout portion recess 127 and an aligned U-shaped recess 131.

Each U-shaped recess comprises two opposing edges 136a-b and a transitional portion 137. As illustrated, the transitional portion 137 comprises a lower, rounded receiving portion 137. The rounded receiving portion 137 of each U-shaped recess 131 generally mates with a rounded lower surface of an irrigation conduit 146 (shown, for example, in FIG. 3) and thus limits the ingress of dirt or debris into a chamber formed by the valve box platform 101 and a valve box 189 or 191 seated on the platform 101, as will be illustrated and discussed below in connection with FIG. 4.

Still with reference to FIG. 1, the valve box platform 101 may further comprise a manifold support bar 139 attached to opposing, inward-facing surfaces 133 of the peripheral wall 107. As illustrated in FIG. 1, the peripheral wall 107 has two opposing short walls 141 and two opposing long walls 143 arranged in a generally rectangular configuration. Of course, alternative configurations are possible, such as four walls in a generally square configuration. The manifold support bar 139, in the embodiment of FIG. 1, is attached to inward-facing surfaces 133 of the two opposing short walls 141. The manifold support bar 139 may receive an irrigation manifold assembly 175 (shown, for example, in FIG. 3), as will be explained below in connection with FIG. 3.

One or more cross-support bars 145a-c may be attached to the manifold support bar 139 and an inward-facing surface 133 of the peripheral wall 107. In one embodiment, as illustrated in FIG. 1, each cross-support bar 145a-c is attached at one end 147 to the manifold support bar 139 and at the opposing end 149 to an inward-facing surface 133 of one of the long walls 143. Of course, each cross-support bar 145a-c could be attached to other portions of the inward-facing surface 133, such as the inward-facing surface 133 of one of the opposing short walls 141. The illustrated embodiment of the valve box platform 101 includes a single main line cross-support bar 185 and three sprinkler line cross-support bars 145a-c. The number and positioning of the cross-support bars 185, 145a-c may be varied within the scope of the disclosed valve box platform 101.

As illustrated in FIG. 1, a valve box platform 101 may include two linearly aligned main line conduit recesses 135. As noted above, a conduit recess 135 may be formed when a selectively removable knockout portion 123 has been removed from the peripheral wall 107 taken in conjunction with an aligned U-shaped recess 131. A main line irrigation conduit 146 (shown, for example, in FIG. 3) in fluid communication with a pressurized fluid source (not shown) may be positioned to enter the valve box platform 101 through one of the main line conduit recesses 135 and optionally exit the valve box platform 101 through the other one of the main line conduit recesses 135. A recessed portion 181 of the main line cross-support bar 185, positioned between the main line conduit recesses 135, is reduced in size (as illustrated, reduced in height along the height axis 117) relative to an elevated portion 183a-c of the main line cross-support bar 185, the manifold support bar 139, and the sprinkler line cross-support bars 145a-c. This recessed portion 181 enables easier manipulation of a main line irrigation conduit 146 (shown, for example, in FIG. 3) positioned within the valve box platform 101 via one or more of the main line conduit recesses 135. As illustrated, the main line conduit recesses 135 are positioned on opposing short walls 141; although, in an alternative embodiment, the main line conduit recesses 135 may be positioned on opposing long walls 143. Also, in one embodiment, one or more main line conduits recesses 135 may be positioned on one or more of the short and/or long walls 141, 143.

The valve box platform 101 may also include one or more sprinkler line conduit recesses 173. Each sprinkler line conduit recess 173 comprises a knockout portion recess 127 (from which the knockout portion 123 has been removed) and an aligned U-shaped recess 131. A sprinkler line conduit 177 (shown in FIG. 3) may be positioned within one or more of the sprinkler line conduit recesses 173 to enable transmission fluid from a manifold assembly 175 (shown in FIG. 3) within the valve box platform 101 to, for example, one or more sprinklers situated outside of the valve box platform 101. As illustrated, the sprinkler line conduit recesses 173 are positioned on one of the long walls 143. Alternatively, one or more of the sprinkler line conduit recesses 173 may be positioned on one or more of the short and/or long walls 141, 143.

In one embodiment, a bottom edge 154 of the peripheral wall 107, a bottom edge 151 of the manifold support bar 139, and a bottom edge 153 of the cross-support bars 145a-c are coplanar such that the bottom edge 151, 153, 154, of each of these items 107, 139, 145a-c are aligned or at least generally aligned along the height axis 117.

The valve box platform 101 may include one or more raised extensions 155. The raised extensions 155 are positioned adjacent to and outside the peripheral wall 107. As illustrated in FIG. 1, each raised extension 155 is elevated along a height axis 117 relative to the receiving surface 109 of the peripheral wall 107. As further illustrated in FIG. 1, the raised extensions 155 may be disposed on one or more corners of the peripheral wall 107 and optionally one or more sides of the peripheral wall 107. The raised extensions 155 serve to maintain a valve box 191 (shown in FIGS. 5-6) positioned on the elevated peripheral surface 111 of the peripheral wall 107 on this surface, i.e., the raised extensions 155 limit movement of such a standard valve box 191 along a length and a width axis 119, 121 when positioned on the elevated peripheral surface 111. To achieve this objective, the raised extensions 155 may be positioned adjacent to opposing portions of the peripheral wall 107, as illustrated in FIG. 1. In addition, raised extensions 155 positioned adjacent to a middle section of the short walls 141 of the valve box platform 101 may engage the mouse hole covers 157, as will be illustrated below in connection with FIGS. 5 and 6.

The valve box platform 101 may optionally include one or more mouse hole covers 157. Each mouse hole cover 157 is selectively removable from the valve box platform 101. For example, as illustrated in FIG. 1, each mouse hole cover 157 is selectively attached by one or more breakaway runners 165 to at least one of the manifold support bars 139, one or more of the cross-support bars 145a-c, and/or an inward-facing surface 133 of the peripheral wall 107. Each mouse hole cover 157 may comprise a main body 159 with an arcuate end 161, a front surface 163, and a bottom surface 167 (shown in FIG. 2), a lip 169 extending from the front surface 163, and two legs 171 (only one of which is shown in FIG. 1) extending away the bottom surface 167. In one embodiment, the mouse hole cover 157 may comprise at least one leg 171. Mouse hole covers 157 are designed to selectively cover mouse holes 192 on a valve box 191 (shown in FIGS. 5-6) and will be discussed in further detail in connection with FIGS. 5 and 6 below. These mouse hole covers 157 thus selectively prevent the ingress of debris through mouse holes 192 in a valve box 191.

Each mouse hole cover 157, prior to removal from the valve box platform 101 (i.e., in its manufactured state), is positioned generally coplanar with the manifold support bar 139 and cross-support bars 145a-c. In particular, the main body 159 of each mouse hole cover 157 is coplanar with the manifold support bar 139 and cross-support bars 145a-c. A height (along a height axis 117) of each mouse hole cover 157, in one embodiment, is approximately less than or equal to a height (along a height axis 117) of adjacent portions of the manifold support bar 139 and/or cross-support bars 145a-c. Thus, each mouse hole cover 157, in its manufactured state, is sized and positioned to fit within an opening 176 defined by an inward-facing surface 133 of the peripheral wall 107, a manifold support bar 139, and one or more cross-support bars 145a-c. Accordingly, in most cases, each mouse hole cover 157 may be maintained in its manufactured state without interfering with usage of the valve box platform 101, enabling each mouse hole cover 157 to be retained in a convenient and known location until usage of a mouse hole cover 157 is desired.

In one embodiment, the valve box platform 101 is approximately 22.3 inches in length (along the length axis 119), approximately 16.7 inches in width (along the width axis 121), and approximately 3.8 inches in height (along the height axis 117). The valve box platform 101 may be fabricated from various materials, including, for example, high-density polyethylene (HDPE).

Figure 2:
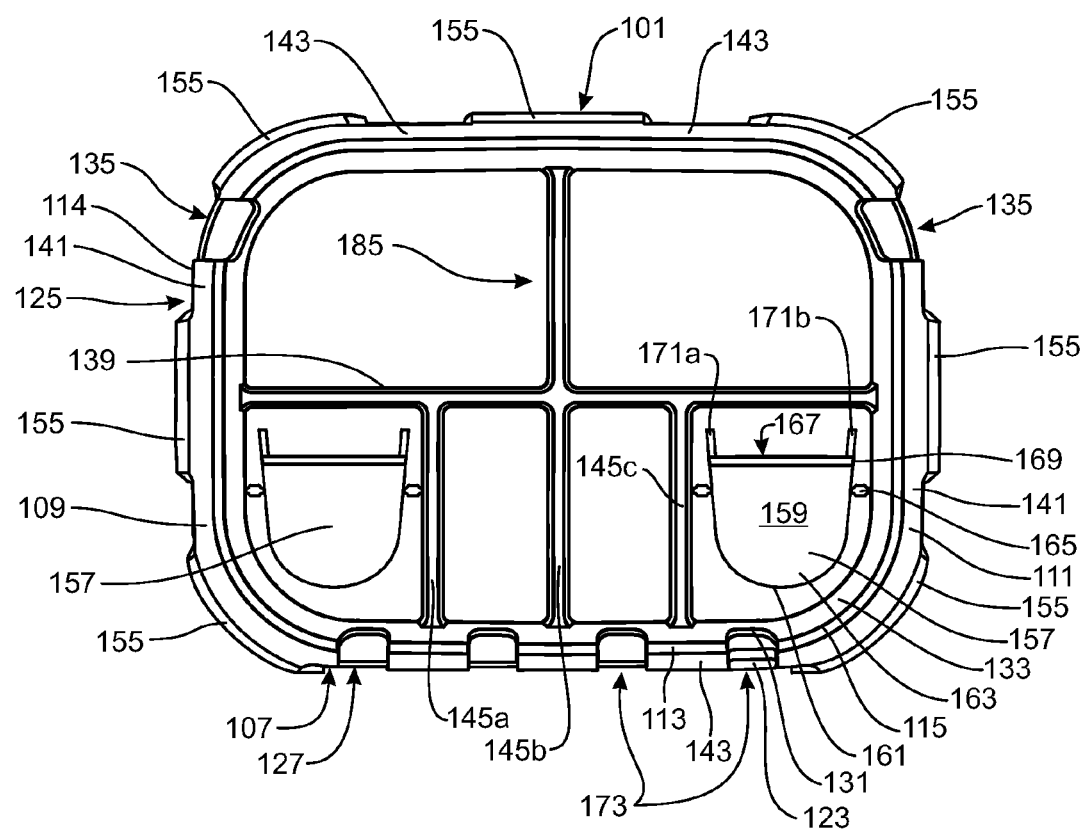
FIG. 2 is a top view of one embodiment of a valve box platform.

FIG. 2 is a top view of one embodiment of a valve box platform 101. The valve box platform 101 illustrated in FIG. 2 includes a peripheral wall 107 having two opposing short walls 141 and two opposing long walls 143 arranged in a generally rectangular configuration. The peripheral wall 107 includes a receiving surface 109. The receiving surface 109 has an elevated peripheral surface 111 that extends around an outer periphery 114 of the receiving surface 109 and a recessed peripheral surface 113 that extends around an inner periphery 115 of the receiving surface 109. In one embodiment (not illustrated), the elevated peripheral surface 111 extends around an inner periphery 115 of the receiving surface 109, and a recessed peripheral surface 113 extends around an outer periphery 114 of the receiving surface 109.

As shown in FIG. 2, each of the knockout portions 123 has been removed from the illustrated valve box platform 101. Thus, the embodiment of the valve box platform 101 shown in FIG. 2 illustrates two main line conduit recesses 135 that are linearly aligned, and four sprinkler line conduit recesses 173. Of course, the number and positioning of each of the main line and sprinkler line conduit recesses 135, 173 may be varied within the scope of the disclosed valve box platform 101. FIG. 2 further illustrates a U-shaped recess 131 disposed within an inward-facing surface 133 of the peripheral wall 107. As illustrated, each U-shaped recess 131 is aligned with a knockout portion 123 recess in the outward-facing surface 125 of the peripheral wall 107.

FIG. 2 also illustrates a manifold support bar 139 attached to each of the opposing short walls 141 and more specifically to an inward-facing surface 133 of each of the two opposing short walls 141. As illustrated in FIG. 2, the valve box platform 101 may include three sprinkler line cross-support bars 145a-c positioned between the manifold support bar 139 and a side of the peripheral wall 107 having the sprinkler line conduit recesses 173 formed therein. A single main line cross-support bar 185 is positioned between the two linearly aligned main line conduit recesses 135 and is further positioned between the manifold support bar 139 and inward-facing surface 133 of the long wall 143 having no sprinkler line conduit recesses 173. In the illustrated embodiment, the main line conduit recesses 135 are slightly wider than each of the sprinkler line recesses 173 to accommodate, for example, a larger size main line irrigation conduit 146 (shown in FIG. 3). For example, in one embodiment, the main line conduit recesses 135 may accommodate a main line conduit 146 (shown in FIG. 3) of up to 1¼ inches in diameter and the sprinkler line conduit recesses 173 may accommodate a sprinkler line conduit 177 (shown in FIG. 3) up to 1 inch in diameter.

FIG. 2 also illustrates one view of the mouse hole covers 157, attached to an inward-facing surface 133 of a short wall 141 and a cross-support bar 145a-c. For example, as illustrated in FIG. 2, each mouse hole cover 157 is selectively attached by one or more breakaway runners 165 to at least one of the manifold support bars 139, one or more of the cross-support bars 145a-c, and/or an inward-facing surface 133 of the peripheral wall 107. Each mouse hole cover 157 comprises a main body 159 with an arcuate end 161, a front surface 163, and a bottom surface 167, a lip 169 extending from the front surface 163, and two legs 171a-b extending away from the bottom surface 167. The illustrated valve box platform 101 also includes raised extensions 155 positioned adjacent to and outside of the peripheral wall 107. As illustrated in FIG. 2, raised extensions 155 are positioned on each corner of the peripheral wall 107, on each of the two opposing short walls 141, and on the long wall 143 that does not have sprinkler line conduit recesses 173.

Figure 3:
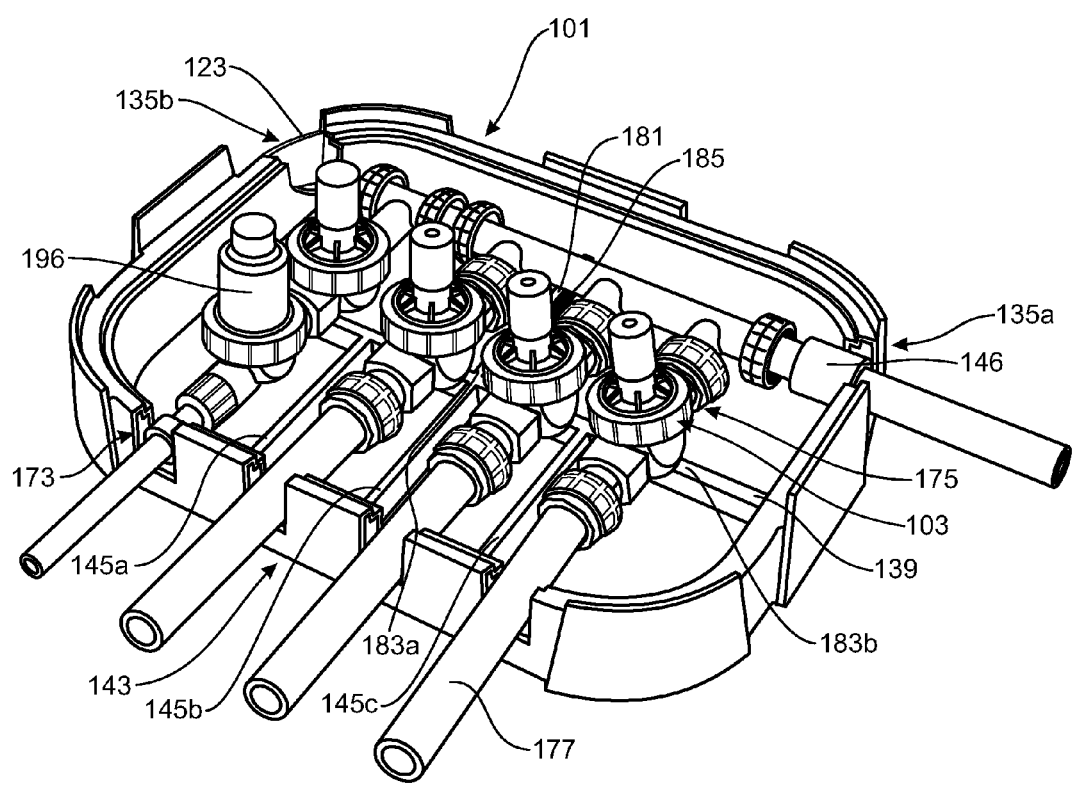
FIG. 3 is a perspective view of one embodiment of a valve box platform, including irrigation valves and conduits situated therein.

FIG. 3 is a perspective view of one embodiment of a valve box platform 101 shown with a manifold assembly 175 that includes irrigation valves 103 and conduits 146, 177 situated in the valve box platform 101. In particular, the manifold assembly 175 may include a main line irrigation conduit 146 in fluid communication with a pressurized fluid source (not shown). The main line irrigation conduit 146 is in fluid communication with a number of different sprinkler line conduits 177 in a manifold configuration. Transmission of fluid through each sprinkler line conduit 177 is governed by various sprinkler valves 103. Each valve 103, which may comprise a solenoid valve 103, may be in electronic communication with a sprinkler valve control box, which, for simplicity, is not illustrated. Electronic signals from the sprinkler valve control box govern whether a particular coupled valve 103 is in an open or a closed state. When in an open state, each control valve 103 enables pressurized fluid from the mainline conduit 146 to move through the coupled sprinkler line conduit 177. In addition, the illustrated manifold assembly 175 may include other components, such as a filter/pressure reducer component 196, as illustrated in FIG. 3.

As further illustrated in FIG. 3, the main line irrigation conduit 146 is positioned within a first main line conduit recess 135a, but does not extend through a second of the main line irrigation recesses 135b, in which the knockout portion 123 is still in place. In other embodiments, a main line irrigation conduit 146, comprising one or more assembled parts of a main line conduit 146, may extend through both the first and second main line conduit recesses 135.

Sprinkler line conduits 177 coupled to the manifold assembly 175 extend through each of the sprinkler line recesses 173. As indicated in FIG. 3, the illustrated sprinkler line recesses 173 may accommodate sprinkler line conduits 177 of different sizes. Knockout portions 123 may be left in place within sprinkler line recesses 173 that are not being utilized to mitigate the intrusion of dirt or debris into the valve box platform 101.

The manifold assembly 175 may rest on the elevated portion 183b of the manifold support bar 139. Sprinkler line cross-support bars 145a-c are disposed between the manifold support bar 139 and the long wall 143 of the valve box platform 101 in which sprinkler line recesses 173 are formed. As illustrated, a recessed portion 181 of the main line cross-support bar 185, which is disposed between the two mainline recesses, is reduced in size relative to an elevated portion 183a of the main line cross-support bar 185, the manifold support bar 139, and the sprinkler line cross-support bars 145a-c. The recessed portion 181 of the main line cross-support bar 185 enables easier manipulation of and access to the main line irrigation conduit 146.

In one embodiment, the valve box platform 101 is a unitary molded piece. Thus, the valve box platform 101 may, in one embodiment, be formed from a polymer material molded during a single molding process to form a unitary molded product.

Figure 4:
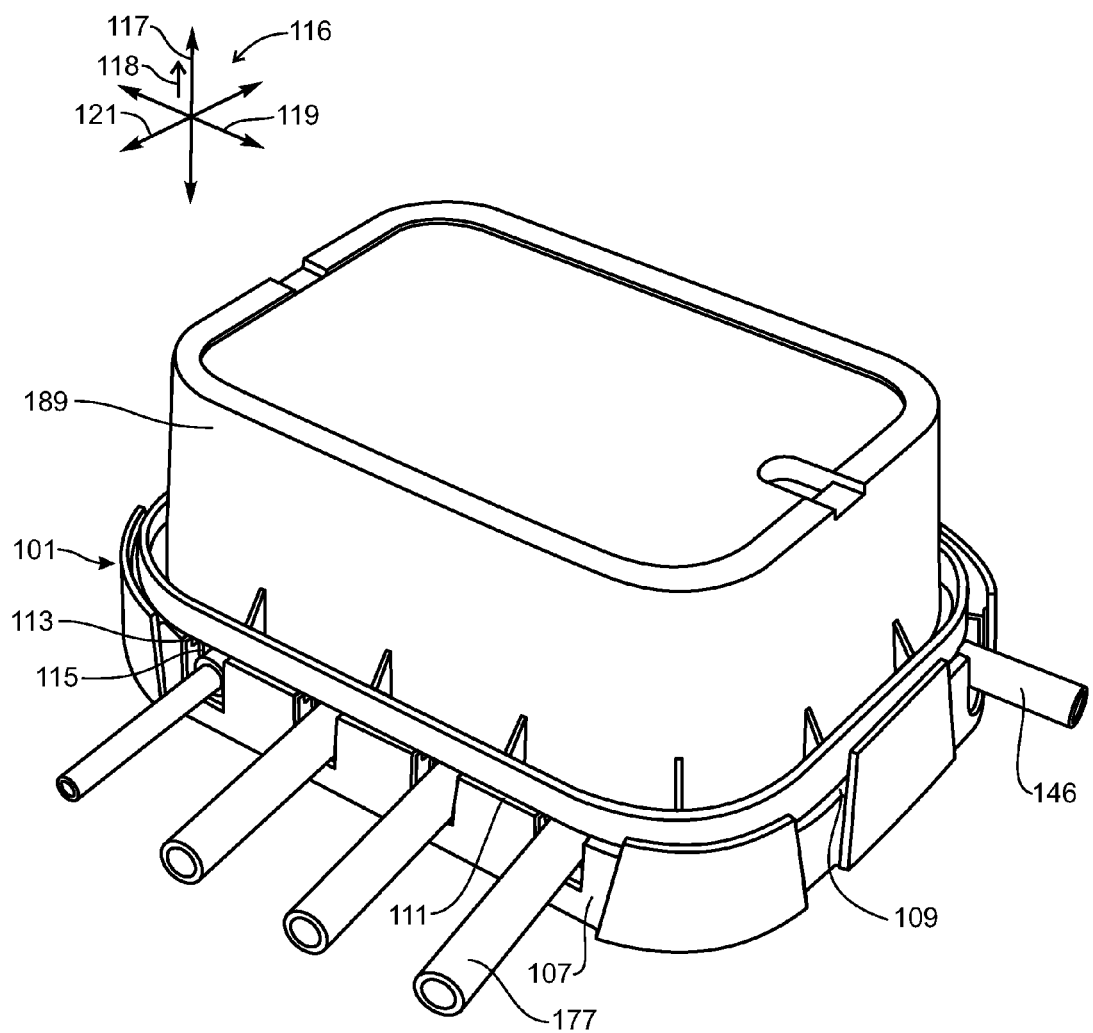
FIG. 4 illustrates one embodiment of a valve box platform with irrigation conduits protruding from the valve box platform and one type of valve box situated thereon.

FIG. 4 illustrates one embodiment of a valve box 189 (e.g., an extension valve box 189) with irrigation conduits 146 protruding from the valve box platform 101. In the illustrated embodiment, the valve box 189 rests on a receiving surface 109 of the peripheral wall 107 of the valve box platform 101. In particular, an illustrated extension valve box 189 may rest on a recessed peripheral surface 113 of the receiving surface 109 that extends around an inner periphery 115 of the receiving surface 109. The elevated peripheral surface 111 is elevated in height (along a height axis 117 of the illustrated axis 116) relative to the recessed peripheral surface 113 such that the elevated peripheral surface 111 may retain the extension valve box positioned on the recessed peripheral surface 113. As indicated above, an elevated point or item relative to another point or item comprises a point or item further along the height axis 117 in the direction of the illustrated height vector 118, irrespective of the orientation of the valve box cover platform 101 relative to the earth's gravitational pull.

Figure 5:
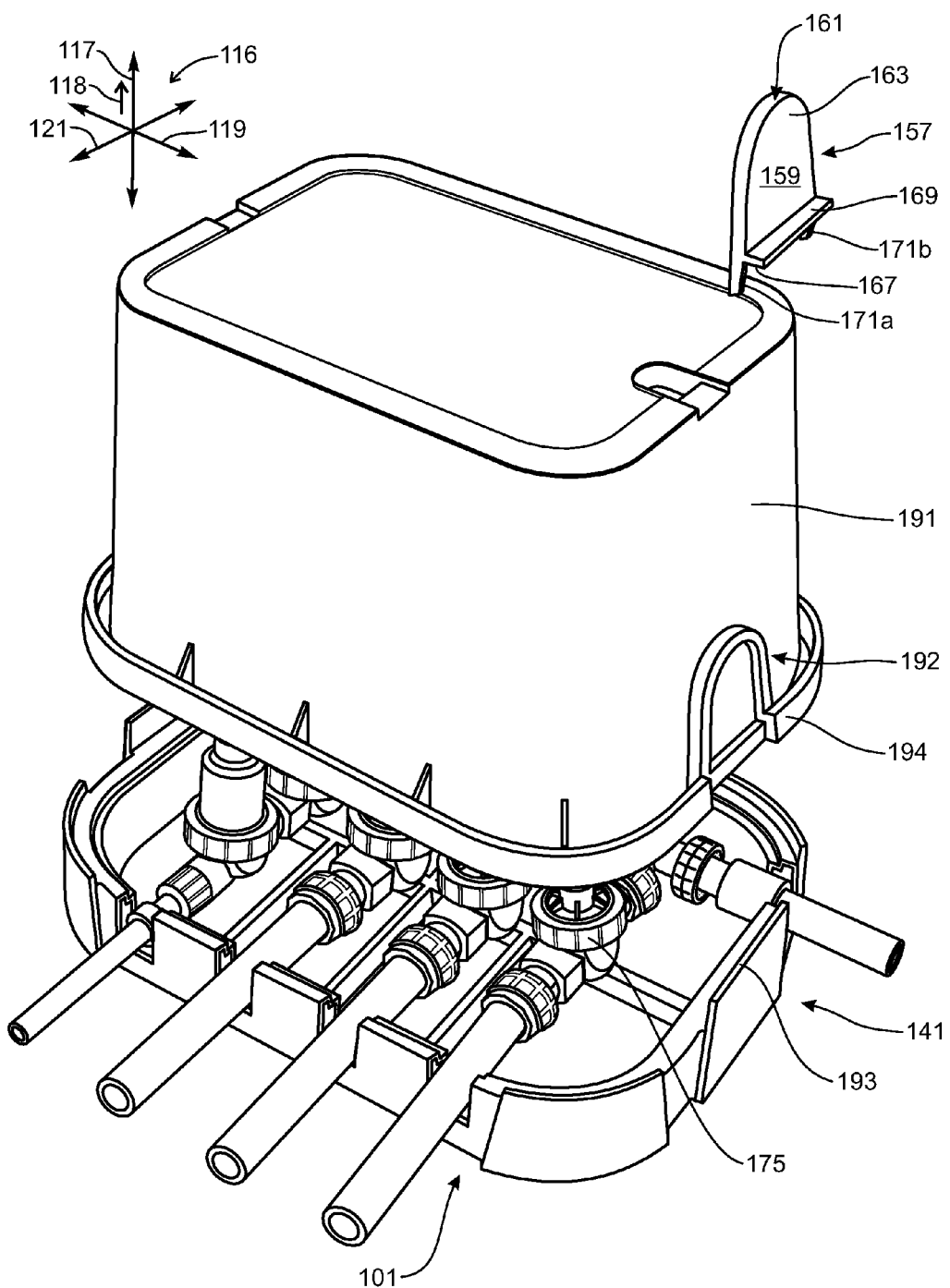
FIG. 5 illustrates an assembly view of one embodiment of a valve box platform having irrigation valves and conduits situated therein together with one type of valve box.
Figure 6:
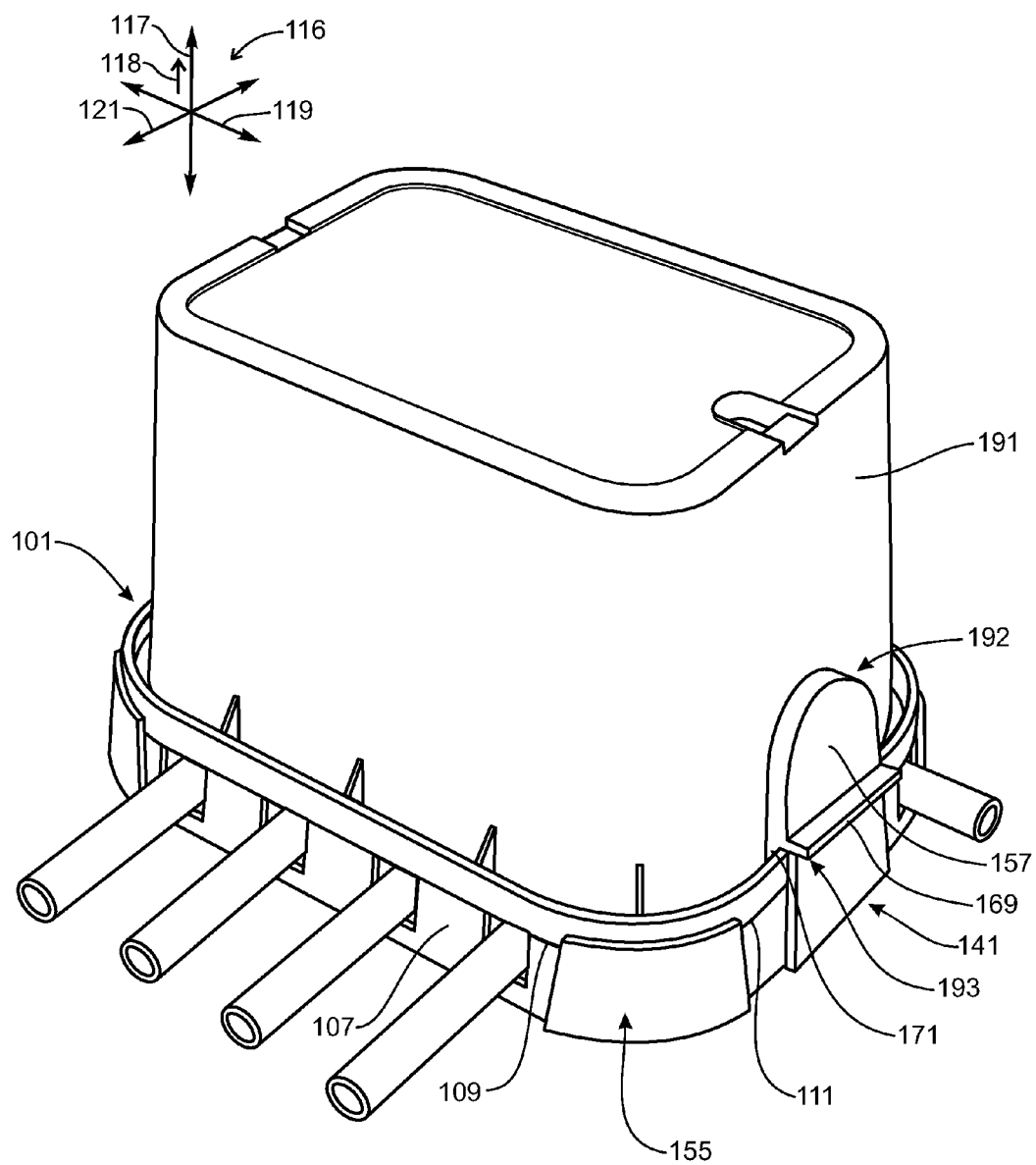
FIG. 6 illustrates one embodiment of a valve box platform with irrigation conduits protruding from the valve box platform and one type of valve box situated thereon.

FIG. 5 illustrates an assembly view of one embodiment of a valve box platform 101 having a manifold assembly 175 situated therein together with a standard valve box 191 and a mouse hole cover 157. In contrast, FIG. 6 illustrates these components 157, 175, 191 in an assembled state. As explained above, the illustrated mouse hole cover 157 comprises a main body 159 with an arcuate end 161, a front surface 163, and a bottom surface 167, a lip 169 extending from the front surface 163, and two legs 171 extending away from the bottom surface 167 of the main body 159.

With reference to both FIGS. 5 and 6, the standard valve box 191 may be positioned on the elevated peripheral surface 111. The main body 159 of the mouse hole cover 157 may be positioned over the mouse hole 192 of the standard valve box 191. The legs 171 may be positioned within and engage with a peripheral skirt 194 of the standard valve box 191 to retain the mouse hole cover 157 over the mouse hole 192. The lip 169 contacts an engaging surface 193 of a raised extension 155 positioned adjacent to a corresponding short wall 141. The engaging surface 193 of the raised extension 155 is a surface or edge of the raised extension 155 most remote from the receiving surface 109 of peripheral wall 107 along a height axis 117 of the illustrated axis 116 in the direction of the height vector 118. The mouse hole cover 157 thus mitigates the ingress of dirt or other debris through the mouse hole 192.

Figure 7:
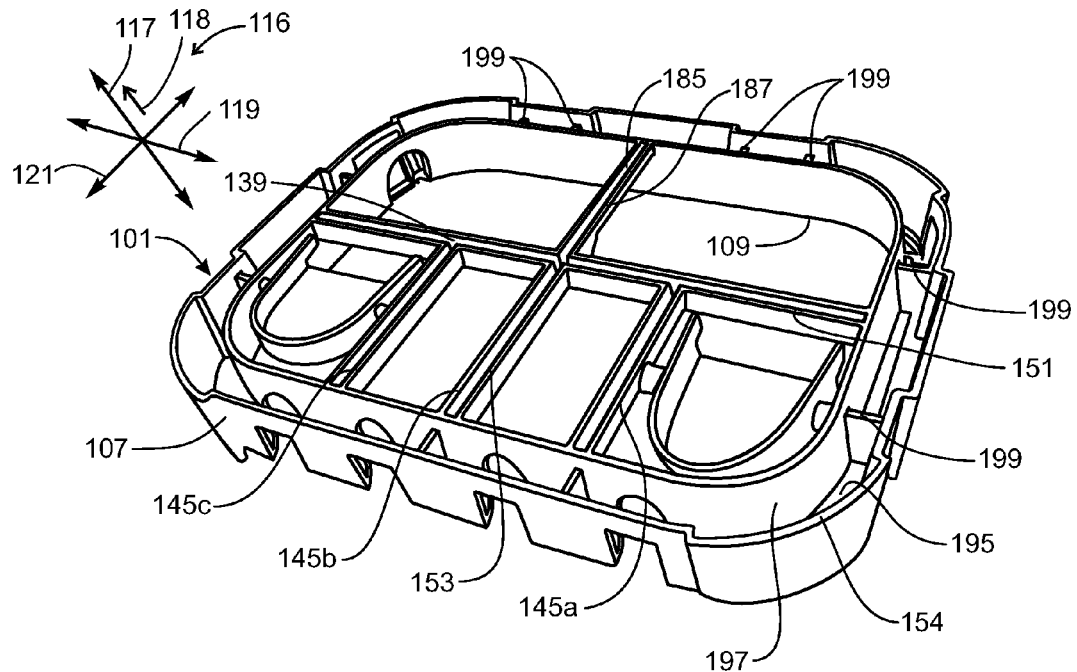
FIG. 7 illustrates a prospective, bottom view of one embodiment of a valve box platform.

FIG. 7 illustrates a prospective, bottom view of one embodiment of a valve box platform 101. In particular, FIG. 7 illustrates a bottom view of the various components of the valve box platform 101, including a bottom view of the peripheral wall 107, the manifold support bar 139, the main line cross-support bar 185, and the three sprinkler line cross-support bars 145a-c. As illustrated in FIG. 7, the bottom edge 151 of the manifold support bar 139, the bottom edge 187 of the main line cross-support bar 185, and the bottom edge 153 of the three sprinkler line cross-support bars 145a-c may be generally coplanar with a bottom edge 154 of the peripheral wall 107 along a height axis 117 of the illustrated axis 116.

In addition, the illustrated valve box platform 101, comprises an open-ended lower surface 195. This lower surface 195 defines a narrowing cavity 197 such that a second valve box platform 101 may be received in a contoured fit within narrowing cavity 197. The optional internal supports 199 within the peripheral wall 107 may contact the receiving surface 109 of a second valve box platform 101 positioned within the narrowing cavity 197. These internal supports 199 not only strengthen the peripheral wall 107, but enable stable stacking of the valve box platform 101, as explained below.

Figure 8:
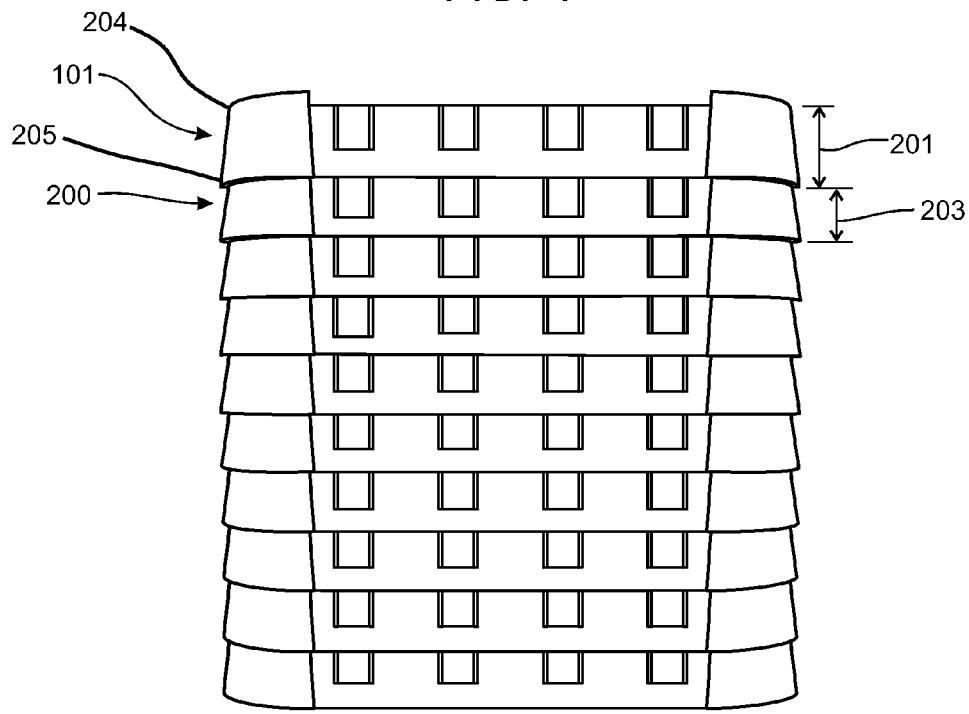
FIG. 8 illustrates a plurality of valve box platforms shown in a nested configuration.

As illustrated in FIG. 8, a plurality of valve box platforms 101 may be arranged in a nested configuration 200. Thus, as illustrated in FIG. 8, the valve box platform 101 has a narrow end 204 and a wide base 205. This nested configuration 200 enables the valve box platforms 101 to be stacked and transported in a convenient and compact fashion. This feature also provides a convenient manner for displaying the valve box platforms 101 for sale, if desired. In one embodiment, although each valve box platform 101 is approximately 3.8 inches in height 201, each nested valve box platform 101 is reduced to approximately 2⅛ inches in height 203 when positioned in a nested configuration 200. In addition, in one embodiment, up to ten (10) valve box platforms 101 may be stacked in a nested configuration 200 both for shipping and merchandising.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A valve box platform comprising:
   a peripheral wall having a receiving surface sized and shaped for receiving valve boxes of two different sizes, the receiving surface having an elevated peripheral surface and a recessed peripheral surface, the elevated peripheral surface and the recessed peripheral surface each extending around either an outer or an inner periphery of the receiving surface, the elevated peripheral surface being elevated relative to the recessed peripheral surface along a height axis of the valve box platform, the valve box platform having a narrow end and a wide base;
   a knockout portion positioned within a first recess in an outward-facing surface of the peripheral wall; and
   a second recess in an inward-facing surface of the peripheral wall, the second recess being U-shaped and having a rounded receiving portion, the second recess being aligned with the knockout portion, the first recess in the outward-facing surface being of a different shape than the second recess in the inward-facing surface.

2. The valve box platform of claim 1, wherein the knockout portion includes a protruding portion that comprises a portion of the elevated peripheral surface of the peripheral wall.

3. The valve box platform of claim 1, further comprising a manifold support bar attached to opposing, inward-facing surfaces of the peripheral wall.

4. The valve box platform of claim 3, wherein a bottom edge of the manifold support bar is generally coplanar with a bottom edge of the peripheral wall.

5. The valve box platform of claim 1, further comprising a raised extension disposed adjacent to and outside the peripheral wall, one end of the raised extension being elevated relative to the receiving surface of the peripheral wall.

6. The valve box platform of claim 1, further comprising a raised extension disposed on each corner of the peripheral wall.

7. A valve box platform comprising:
   a peripheral wall;
   a manifold support bar attached to opposing, inward-facing surfaces of the peripheral wall;
   one or more cross-support bars attached to the manifold support bar and the peripheral wall; and
   at least one removable mouse hole cover, each removable mouse hole cover being secured by a breakaway runner to at least one of the manifold support bar, the one or more cross-support bars, or the peripheral wall, wherein each removable mouse hole cover comprises a main body, the main body comprising an arcuate end, a front surface, and a bottom surface generally opposite the arcuate end, the removable mouse hole cover further comprising a lip extending in a generally perpendicular direction from the front surface, and at least one leg extending away from the bottom surface of the main body, the leg being generally co-planar with the body.

8. The valve box platform of claim 7, wherein an elevated portion of the manifold support bar is elevated relative to a recessed portion of the one or more cross-support bars.

9. The valve box platform of claim 7, wherein a bottom edge of the manifold support bar is generally coplanar with a bottom edge of the peripheral wall.

10. The valve box platform of claim 7, further comprising a raised extension disposed on each corner of the peripheral wall.

11. A valve box platform comprising:
a peripheral wall having a receiving surface sized and shaped for receiving a valve box, the peripheral wall having an outward-facing surface, an inward-facing surface, a first side and a second side, the peripheral wall extending about a central region of the valve box platform, the central region comprising at least one support bar, the central region being intermediate the first side and the second side, the first side being opposite the second side on the valve box platform;
a knockout portion positioned within a first recess in the outward-facing surface of the peripheral wall; and
a second recess in the inward-facing surface of the peripheral wall, the second recess being U-shaped and having a rounded receiving portion, the second recess being aligned with the knockout portion, the first recess in the outward-facing surface being of a different shape than the second recess in the inward-facing surface, both the knockout portion and the aligned second recess being disposed in the first side of the peripheral wall.

12. The valve box platform of claim 11, further comprising a manifold support bar attached to the peripheral wall, one or more cross-support bars attached to the manifold support bar and the peripheral wall, at least one mouse hole cover secured by a breakaway runner to at least one of the manifold support bar, one of the one or more cross support bars or the peripheral wall, wherein each mouse hole cover comprises a main body with an arcuate end, a front surface, a lip extending from the front surface, and at least one leg extending away from the main body.

13. The valve box platform of claim 12, wherein an elevated portion of the manifold support bar is elevated relative to a recessed portion of the at least one of the one or more cross-support bars.

14. The valve box platform of claim 12, wherein a bottom edge of the manifold support bar is generally coplanar with a bottom edge of the peripheral wall.

15. The valve box platform of claim 12, wherein the valve box platform comprises a unitary molded piece.

16. The valve box platform of claim 11, further comprising a raised extension disposed adjacent to and outside the peripheral wall, a top of the raised extension being elevated relative to the receiving surface of the peripheral wall, wherein the raised extension mates with a removable mouse hole cover when the removable mouse hole cover is detached from the valve box platform and secured over a mouse hole of a valve box positioned on the valve box platform.

17. The valve box platform of claim 11, further comprising a plurality of raised extensions disposed adjacent to the peripheral wall.

18. The valve box platform of claim 11, further comprising an open-ended lower surface defining a narrowing cavity such that a portion of a second valve box platform may be received in a contoured fit within the narrowing cavity.

19. The valve box platform of claim 11, further comprising a cavity intermediate the outward-facing surface and the inward-facing surface, the outward-facing surface, the cavity, and the inward-facing surface extending about the central region of the valve box platform.

20. The valve box platform of claim 19, wherein the knockout portion and the aligned second recess are on the first side of the peripheral wall such that the cavity but not the central region is disposed intermediate the knockout portion and the aligned second recess.

21. A valve box platform comprising:
a peripheral wall having a receiving surface sized and shaped for receiving a valve box, the receiving surface having an elevated peripheral surface and a recessed peripheral surface, the elevated peripheral surface and the recessed peripheral surface each extending around either an outer or an inner periphery of the receiving surface, the elevated peripheral surface being elevated relative to the recessed peripheral surface along a height axis of the valve box platform;
a knockout portion positioned in a first recess in an outward-facing surface of the peripheral wall, the knockout portion occupying an entirety of the first recess in the outward-facing surface; and
a second recess in an inward-facing surface of the peripheral wall, second recess being U-shaped and having a rounded receiving portion, the second recess being aligned with the knockout portion, the first recess in the outward-facing surface being of a different shape than the second recess in the inward-facing surface.

22. A first valve box platform comprising:
a peripheral wall having a receiving surface sized and shaped for receiving valve boxes of two different sizes, the receiving surface having an elevated peripheral surface and a recessed peripheral surface, the elevated peripheral surface and the recessed peripheral surface each extending around either an outer or an inner periphery of the receiving surface, the elevated peripheral surface being elevated relative to the recessed peripheral surface along a height axis of the first valve box platform, the peripheral wall defining an open-ended cavity within the peripheral wall, the open-ended cavity extending within the peripheral wall along a periphery of the valve box platform and not extending to a center of the first valve box platform along a width axis of the first valve box platform, the open-ended cavity being sized and shaped to receive a receiving surface of a second valve box platform within the open-ended cavity within the peripheral wall, the second valve box platform being of a same size and shape as the first valve box platform;
a knockout portion positioned within the peripheral wall; and
a U-shaped recess having a rounded receiving portion within the peripheral wall, the U-shaped recess being aligned with the knockout portion.

* * * * *